United States Patent

Pesola

(10) Patent No.: US 8,897,312 B2
(45) Date of Patent: Nov. 25, 2014

(54) RADIO SYSTEM CO-EXISTENCE IMPROVEMENT BY DATA THROTTLING

(75) Inventor: Mikko Pesola, Märynummi (FI)

(73) Assignee: Nokia Corporation, Espoo (FI)

( * ) Notice: Subject to any disclaimer, the term of this patent is extended or adjusted under 35 U.S.C. 154(b) by 170 days.

(21) Appl. No.: 13/813,344

(22) PCT Filed: Aug. 2, 2010

(86) PCT No.: PCT/FI2010/050612
§ 371 (c)(1),
(2), (4) Date: Jan. 30, 2013

(87) PCT Pub. No.: WO2012/017129
PCT Pub. Date: Feb. 9, 2012

(65) Prior Publication Data
US 2013/0142157 A1    Jun. 6, 2013

(51) Int. Cl.
| H04L 12/28 | (2006.01) |
| H04W 72/08 | (2009.01) |
| G01S 19/21 | (2010.01) |
| H04B 1/10 | (2006.01) |
| H04W 72/12 | (2009.01) |
| H04W 52/02 | (2009.01) |
| H04W 28/14 | (2009.01) |

(52) U.S. Cl.
CPC .............. *H04W 72/082* (2013.01); *G01S 19/21* (2013.01); *H04B 1/1027* (2013.01); *H04W 72/1215* (2013.01); *H04W 52/0238* (2013.01); *H04W 28/14* (2013.01); *H04W 52/0216* (2013.01)
USPC ............................. 370/412; 370/252; 370/328

(58) Field of Classification Search
None
See application file for complete search history.

(56) References Cited

U.S. PATENT DOCUMENTS

| 6,470,003 | B1 * | 10/2002 | Smith et al. ............... 370/345 |
| 8,509,103 | B2 * | 8/2013 | Gao et al. .................. 370/252 |
| 2004/0203367 | A1 | 10/2004 | Nowlin |
| 2006/0223444 | A1 | 10/2006 | Gross et al. |
| 2009/0180451 | A1 | 7/2009 | Alpert et al. |
| 2009/0209262 | A1 | 8/2009 | Stamoulis et al. |
| 2009/0249096 | A1 * | 10/2009 | Conner et al. ............. 713/320 |
| 2010/0144279 | A1 | 6/2010 | Vasenkari et al. |

FOREIGN PATENT DOCUMENTS

| CN | 1205816 A | 1/1999 |
| CN | 101529734 A | 9/2009 |
| WO | 2009/103183 A1 | 8/2009 |

OTHER PUBLICATIONS

International Search Report dated Apr. 27, 2011 corresponding to International Patent Application No. PCT/FI2010/050612.
Chinese Office Action application No. 2010800684006 dated Feb. 27, 2014.

* cited by examiner

*Primary Examiner* — Duc C Ho
(74) *Attorney, Agent, or Firm* — Squire Patton Boggs (US) LLP

(57) ABSTRACT

The coexistence of multiple radio systems may depend on the ability of a terminal device to limit interference among competing systems. In a method, a system may detect a potential for interference between a transmitting subsystem of a terminal and a receiving subsystem of a terminal. The method may also include buffering transmission by the transmitting subsystem of the terminal so as to lower a duty cycle of the transmitting subsystem.

15 Claims, 4 Drawing Sheets

RADIO SYSTEM CO-EXISTENCE IMPROVEMENT BY DATA THROTTLING

BACKGROUND

1. Field

Certain embodiments relate generally to communication systems, and more particularly, time domain solutions to solve interference, in particular, embodiments relate to an apparatus, system, and method of a base station controlling data transmission of an interfering radio system by throttling the data transmitted from a mobile terminal.

2. Description of the Related Art

In cellular systems, such as long term evolution (LTE) or wideband code-division multiple access (WCDMA), a mobile device or terminal is not allowed to control its own reception (RX) or transmission (TX) timing. All timing and power control is performed at a base station, so internal control in the terminal is quite limited in the case of such cellular systems. Also, there is no signaling between different radio systems that the terminal uses. Accordingly, the base station has no information about whether terminal interference has occurred, exists, or is likely to exist. In practice, timing control is allowed only for broadcasting systems where it is possible that the terminal makes independently a decision to stop reception.

Without signaling, a time domain solution is conventionally limited to cases where the interfering system has low duty cycle. The time domain solution can be used between global system for mobile communication (GSM) and global positioning system (GPS). When a GSM-equipped device is transmitting for GSM communication, the GSM transmission interferes with GPS reception in the same device, namely in the GSM-equipped device. It is possible within the one terminal to tell the GPS receiver the period when GSM is transmitting and leave that part of corrupted GPS data unused. However, when GSM is transmitting only one-eighth of the time, this does not reduce GPS performance significantly. The same idea does not work properly with LTE, however, because LTE uplink duty cycle can be much higher than one-eighth of the time.

SUMMARY

In certain embodiments, a method can include detecting a potential for interference between a transmitting subsystem of a terminal and a receiving subsystem of a terminal. The method can also include buffering transmission by the transmitting subsystem of the terminal so as to lower a duty cycle of the transmitting subsystem.

In other embodiments, an apparatus can include detecting means for detecting a potential for interference between a transmitting subsystem of a terminal and a receiving subsystem of a terminal. The apparatus can also include buffering means for buffering transmission by the transmitting subsystem of the terminal so as to lower a duty cycle of the transmitting subsystem.

In further embodiments, a computer program can be embodied on a computer-readable medium, and can, when executed in hardware, perform a process. The process can include detecting a potential for interference between a transmitting subsystem of a terminal and a receiving subsystem of a terminal. The process can also include buffering transmission by the transmitting subsystem of the terminal so as to lower a duty cycle of the transmitting subsystem.

An apparatus, in certain embodiments, can include at least one memory including computer program code. The apparatus can also include at least one processor. The at least one memory and the computer program code are configured to, with the at least one processor, cause the apparatus at least to detect a potential for interference between a transmitting subsystem of a terminal and a receiving subsystem of a terminal. The at least one memory and the computer program code are configured to, with the at least one processor, cause the apparatus at least to buffer transmission by the transmitting subsystem of the terminal so as to lower a duty cycle of the transmitting subsystem.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
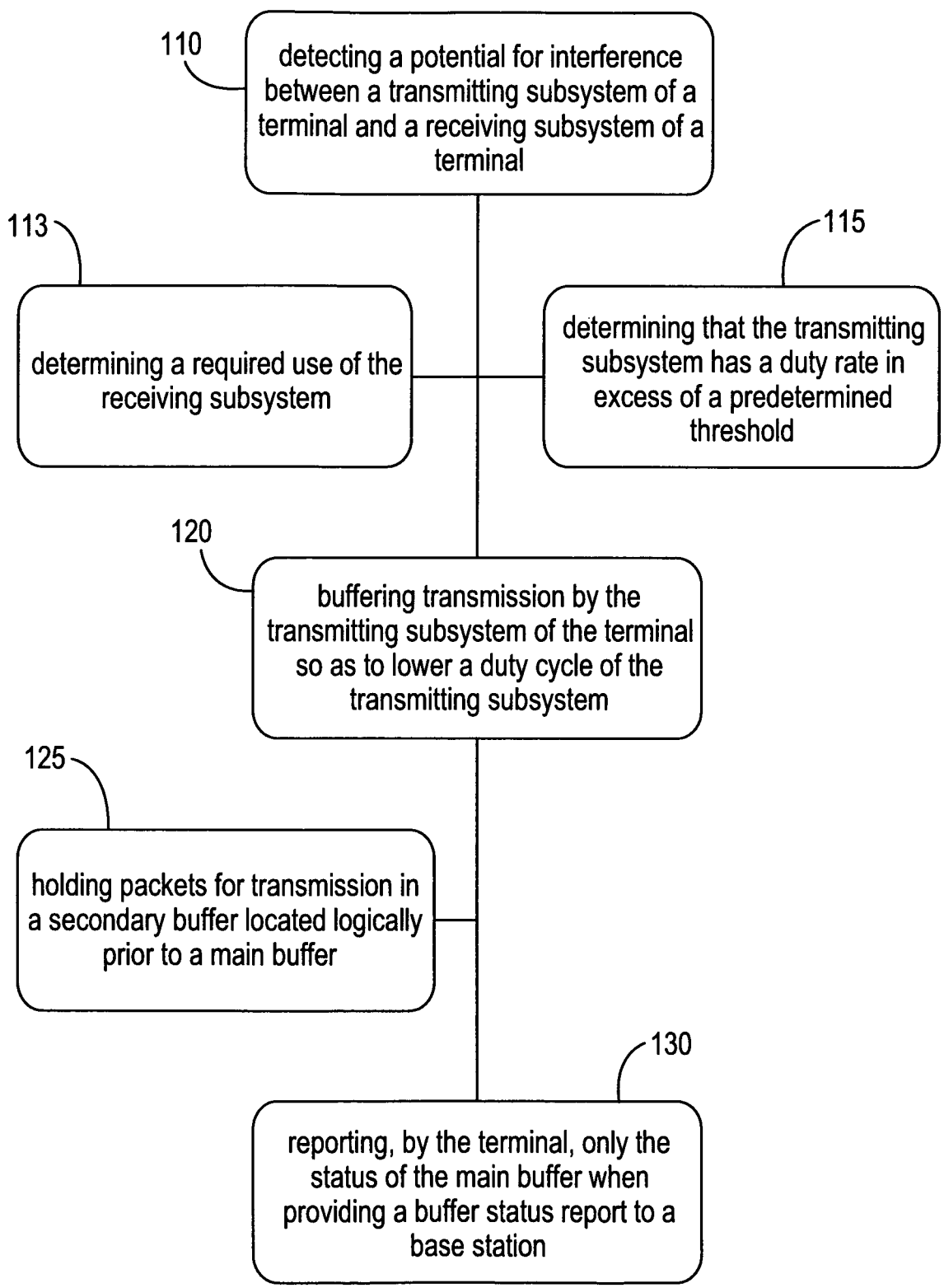
FIG. 1 illustrates a method, according to certain embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Simple handheld terminals may communicate with more than one cellular radio system. Cellular radio systems include the global system for mobile communications (GSM), wideband code division multiple access (WCDMA), time division synchronous code division multiple access (TD-SCDMA), and long term evolution (LTE). In addition to cellular radio systems, there are complementary wireless radios, such as wireless local area network (WLAN) and Bluetooth®, for data transmission. Also, a global positioning system (GPS) receiver as part of the terminal is becoming a standard feature. Often, the simultaneous operation of two radio systems in the same device is challenging because interference from one system transmission can interfere with reception of another system reception.

Interference that affects global positioning system (GPS) or other satellite navigation systems, such as Glonass, Compass, and Galileo, may be relevant to new long term evolution (LTE) frequency bands at 700 MHz. This is due to the fact that second harmonic from the LTE band can hit the satellite navigation band and cause much higher interference than from other cellular frequency bands.

Interference may also occur between industrial, scientific, and medical (IMS) band, including Bluetooth® and wireless local area network (ALAN), and new LTE bands 40 and 7. The guard band with these bands is very small or, in the case of band 40 and IMS, the band may be non-existent.

Interference issues between two radios in one terminal, mobile device, or user terminal can be addressed by increasing isolation between radios by filtering, better antenna design, and shielding. Another approach to interference problems is a frequency domain solution in which frequency of the LTE transmission is changed to avoid interference. However, frequency domain solutions are not always possible and, in those cases, the alternative is to solve interference in time domain. Certain embodiments of the present invention relate particularly to time domain solutions.

In packet-based radio systems, such as LTE or high speed packet access plus (HSPA+), an uplink transmission can be discontinuous and a duty cycle depends on the amount of data to be transmitted. In an LTE system, the terminal signals a data buffer status to the base station and the base station (BS) uses the buffer status when allocating uplink resources. This means that if the buffer is empty, the transmitter is shut down except for some very short periods for uplink control channel.

Certain embodiments of the present invention configure the base station to control the transmission of the interfering radio system by throttling the transmitted data in the device. The base station may be so configured by providing the base station with a buffer status report that is lower than the actual amount of data packets that are to be transmitted. One way to accomplish this lower buffer status report is to create a secondary buffer that prevents the main buffer from being filled. This throttling automatically creates a low duty cycle in the uplink and gives time for the victim system to receive undisturbed. The term "victim system" refers to the communication system that is being interfered with by an interfering communication system.

In one implementation, there is radio system pair that has co-existence issues. For example, an LTE system operating in the 700 MHz band causes interference to GPS. When the victim system is switched on, the uplink data in the interfering system is throttled to create a low enough duty cycle. In one example, the victim system can be GPS and the interfering system is LTE The victim system can then use the information about the interfering system transmission to operate only during the quiet period, or it may be able to operate without this information, if the duty cycle is low enough.

The actual throttling is possible by using an additional data buffer or a secondary buffer before the actual uplink data buffer. When throttling is needed, data can be kept in the additional buffer. The terminal then can report to the base station that the data buffer is empty. Such report can cause the base station to order the terminal to stop transmitting. After a quiet period, on the order of a few milliseconds, the terminal can transfer part or all of the data from the additional buffer to the actual data buffer and the transmission can continue. Physically the two buffers can be in the same memory.

The few milliseconds mentioned above can be considered, for example, in terms of LTE sub-frames. One sub-frame is typically one millisecond long and it can be the shortest time that the LTE terminal can transmit or be quiet. In other words, a sub-frame may serve as the smallest degree of granularity. The number of quiet sub-frames can depend on what limit is to be placed on the interference for the receiving system, as well as on how much penalty is acceptable with respect to data rate in the transmitting system. In the GPS case, the victim system reception is traditionally continuous and data rate is slow compared to LTE sub-frame length. Thus, many quiet periods may be needed for one GPS fix. Accordingly, selecting the appropriate number of milliseconds may be more related to duty cycle than length of a single quiet period.

In the LTE-GPS case, a duty cycle less than 50% may be necessary to get good GPS performance. So, for example, a 25% duty cycle would mean ideally 1 ms transmission and 3 ms quiet period. In practice, the scheduler behavior can vary depending on different things. For example, the scheduler can schedule differently based on how many other users there are in the network. So the terminal device may not know exactly how many sub-frames the scheduler will allocate once the terminal device reports that there is again data in the buffer. Thus, if the base station scheduler would allocate, for example, two sub-frames and the terminal device still wants to maintain the 25% duty cycle, then the terminal device can keep the buffer empty long to get a 6 ms quiet period.

If the victim system is also packet based, like WLAN-LTE or LTE-WLAN cases, both the duty cycle and the length of the single quiet period can be taken into account. By taking both the duty cycle and the length of the single quiet period into account, the victim system may have time to receive a full frame or sub-frame.

Certain embodiments of the present invention can be used to solve difficult co-existence challenges that may have no filtering solution. There may be slower uplink data rate during the time when data throttling is used. However, there may be reduced power consumption during throttling. So, in certain embodiments, terminal heating can be controlled by data throttling.

Although the present invention has been discussed above in terms of GPS being interfered with by LTE, other interferences are also possible, such as interference produced by WLAN or Bluetooth®.

The approach used in certain embodiments of the present invention may be variously described. For example, in certain embodiments, application data that would be transmitted to the network can be said to be double buffered, so that the network sees an empty transmission buffer on the terminal side and does not schedule a transmission slot when the terminal plans to, for example, do a GPS fix.

Figure 4:
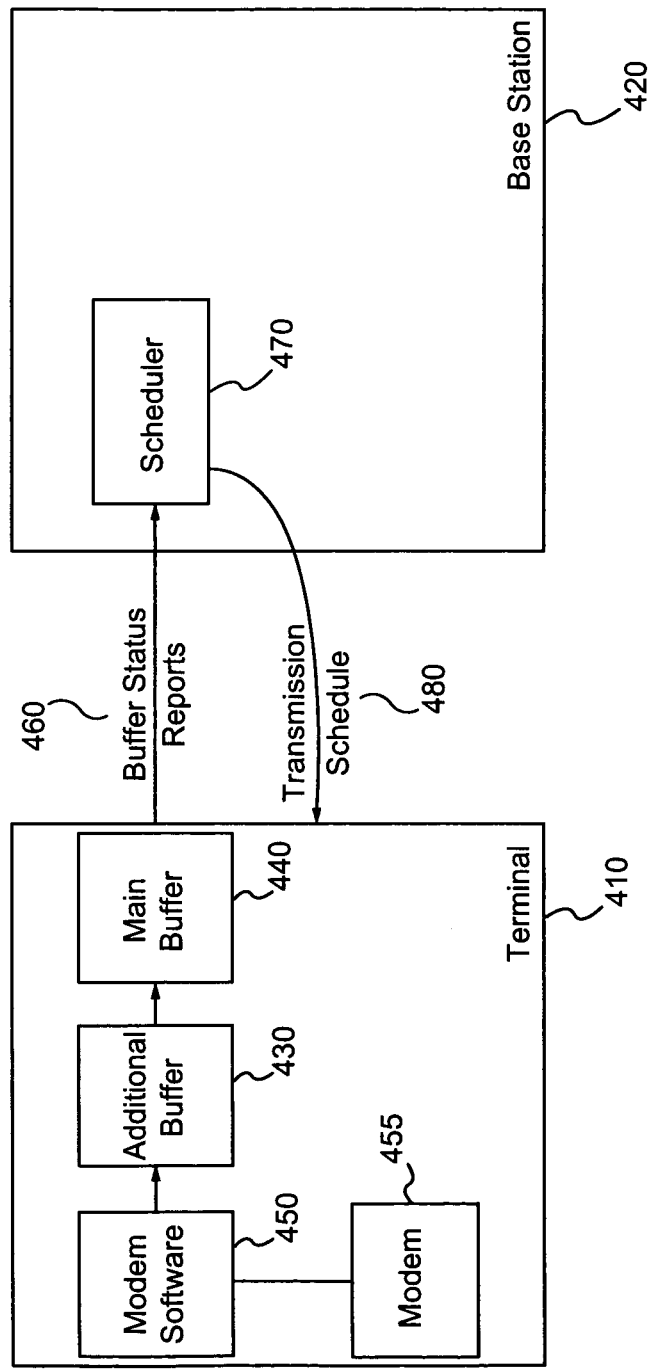
FIG. 4 illustrates a system, according to certain embodiments of the present invention.

Various implementations of the present invention are possible. On example of a system according to the present invention is shown in FIG. 4. The system of FIG. 4 includes a terminal 410 and a base station 420 in communication with one another over, for example, a wireless connection. As shown in FIG. 4, an additional buffer 430 can be added before the main data buffer 440 in the terminal 410 and data can be kept in the additional buffer as long as a gap is needed in transmission. Software (SW) 450 for a modem 455 in the terminal 410 and the communication between the terminal 410 and the base station 420 can work normally according to, for example, the 3GPP specifications, so the terminal 410 can just report, in buffer status reports 460, the main buffer status to the base station 420. The scheduler 470 in the base station 420 can, thus, get normal buffer status reports (BSRs) 460, which, however, do not reflect the contents of the additional buffer 430 but only the main buffer 440. When the main buffer 440 is empty, the base station reports 460 will cause the base station 420 to stop scheduling uplink resources in the transmission schedule 480 provided to the terminal 410. So, the base station 420 does not need to be aware of the throttling, because it happens before the terminal's main buffer 440.

Conventionally, the base station 420 only sees the main buffer 440 status, because the buffer status reports relate to the main buffer 440.

Various types of buffer status reports are possible. For example, buffer status reports as used in LTE are one possibility and will be described below, but similar mechanisms may be used in other packet based cellular systems, for example, WCDMA/HSPA+.

Measurement reports can enable the scheduler to operate in both uplink and downlink These include transport volume and measurements of a user equipment's radio environment. Uplink buffer status reports can be used to provide support for quality of service (QoS)-aware packet scheduling. In evolved universal terrestrial radio access network (E-UTRAN) uplink buffer status reports refer to the data that is buffered in for a logical channel group (LCG) in the user equipment. Four logical channel groups and two formats can be used for reporting in uplink.

A first format is a short format for which only one buffer status report of one logical channel group is reported. A second format is a long format for which all four buffer status reports of all four logical channel groups are reported. Uplink buffer status reports can be transmitted using MAC signaling. Similar mechanisms to those described above may also be used without departing from the scope of the invention.

FIG. 1 illustrates a method, according to certain embodiments of the present invention. As shown in FIG. 1, the method can include detecting 110 the potential for interference between a transmitting subsystem of a terminal and a receiving subsystem of a terminal. The method can also include buffering 120 transmission by the transmitting subsystem of the terminal so as to lower a duty cycle of the transmitting subsystem.

The detecting 110 the potential for interference comprises determining 113 a required use of the receiving subsystem, namely that use of the receiving subsystem is required. For example, if the transmitting system is LTE and the receiving system is GPS, the terminal may determine that a location determination is to be made. Thus, the GPS sub-system may be required to be used.

The detecting 110 the potential for interference comprises determining 115 that the transmitting subsystem has a duty rate in excess of a predetermined threshold. For example, if the transmitting system is LTE and the receiving system is GPS, the terminal may determine that transmission is occurring or is about to occur with an effective duty rate of greater then one-eighth of the time.

The buffering 120 transmission includes holding 125 packets for transmission in a secondary buffer located logically prior to a main buffer. By logically prior, it should be understood that there is no particular requirement on the physical location of this secondary buffer. However, the secondary buffer should be viewed as the source for the main buffer. Thus, until the secondary buffer is released, no new data can enter the main buffer. Thus, data transmission from the terminal can be effectively throttled.

The method can additionally include reporting 130, by the terminal, only the status of the main buffer when providing a buffer status report to a base station. Alternatively, the base station may request, and the terminal may provide, a status of the secondary buffer.

The method of FIG. 1 may be variously implemented. It may, for example, be implemented by a computer program embodied on a computer-readable medium, which when executed in hardware performs the method of FIG. 1. Alternatively, the method of FIG. 1 or algorithm described in connection with the embodiments disclosed herein may be embodied directly in hardware, in a computer program executed by a processor, or in a combination of the two. A computer program may be embodied on a computer readable medium, such as a storage medium. The computer-readable medium can be a non-transitory medium, random access memory (RAM), flash memory, read-only memory (ROM), erasable programmable read-only memory (EPROM), electrically erasable programmable read-only memory (EEPROM), registers, hard disk, a removable disk, a compact disk read-only memory (CD-ROM), or any other form of storage medium known in the art. An exemplary storage medium may be coupled to the processor such that the processor can read information from, and write information to, the storage medium. In the alternative, the storage medium may be integral to the processor. The processor and the storage medium may reside in an application specific integrated circuit (ASIC). In the alternative, the processor and the storage medium may reside as discrete components.

Figure 2:
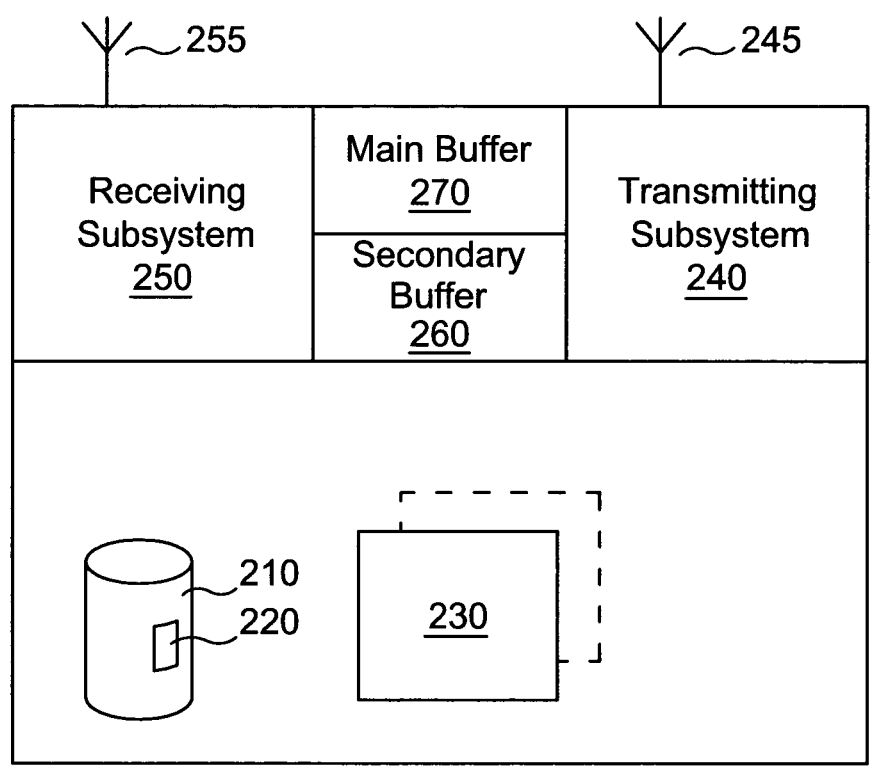
FIG. 2 illustrates an apparatus, according to certain embodiments of the present invention.

FIG. 2 illustrates an apparatus, according to certain embodiments of the present invention. As shown in FIG. 2, the apparatus can include at least one memory 210 including computer program code 220. The apparatus can also include at least one processor 230. The memory 210 and the computer program code 220 can be configured, with the processor 230 to perform a process, such as the process illustrated in FIG. 1.

The memory 210 may be any suitable memory, such as RAM, ROM, or a removable disk, such as a compact disc (CD) or digital versatile disc (DVD). The computer program code 220 can be any suitable set of computer instructions, such as hand-written assembly code, compiled code, or interpreted code. The processor 230 can be any processing device, such as a controller, a central processing unit (CPU), or an application specific integrated circuit (ASIC). In certain embodiments, the terminal may be a mobile phone or personal digital assistant. Thus, the processor 230 or memory 210 may be a shared processor 230 and memory 210.

The apparatus may also include a transmitting subsystem 240, with a first antenna 245 and a receiving subsystem 250, with a second antenna 255. The transmitting subsystem 240 may be a subsystem for cellular telephony. Thus, the transmitting subsystem 240 may include both transmission and reception features, although it is the transmission features that are particularly germane to the discussions herein.

Likewise, the receiving subsystem 250 may or may nor have transmission capabilities, in addition to reception capabilities. In the case of a GPS receiver system, for example, there may be no requirement for any transmission capabilities.

More specifically, the at least one memory 210 and the computer program code 220 can be configured to, with the at least one processor 230, cause the apparatus at least to detect a potential for interference between a transmitting subsystem 240 of a terminal and a receiving subsystem 250 of a terminal. The apparatus itself may be the terminal. The transmitting subsystem 240 can be a long term evolution communication subsystem. The receiving subsystem 250 can be a global positioning system navigational subsystem. The at least one memory 210 and the computer program code 220 can also be configured to, with the at least one processor 230, cause the apparatus at least to buffer transmission by the transmitting subsystem 240 of the terminal so as to lower a duty cycle of the transmitting subsystem 240.

The at least one memory 210 and the computer program code 220 can further be configured to, with the at least one processor 230, cause the apparatus at least to detect the potential for interference by determining a required use of the receiving subsystem 250. The at least one memory 210 and the computer program code 220 can additionally be configured to, with the at least one processor 230, cause the apparatus at least to detect the potential for interference by determining that the transmitting subsystem 240 has a duty rate in excess of a predetermined threshold.

The at least one memory 210 and the computer program code 220 can also be configured to, with the at least one processor 230, cause the apparatus at least to buffer transmission by holding packets for transmission in a secondary buffer 260 located logically prior to a main buffer 270. The at least one memory 210 and the computer program code 220 can further be configured to, with the at least one processor 230, cause the apparatus at least to report only the status of the main buffer 270 when providing a buffer status report to a base station.

Figure 3:
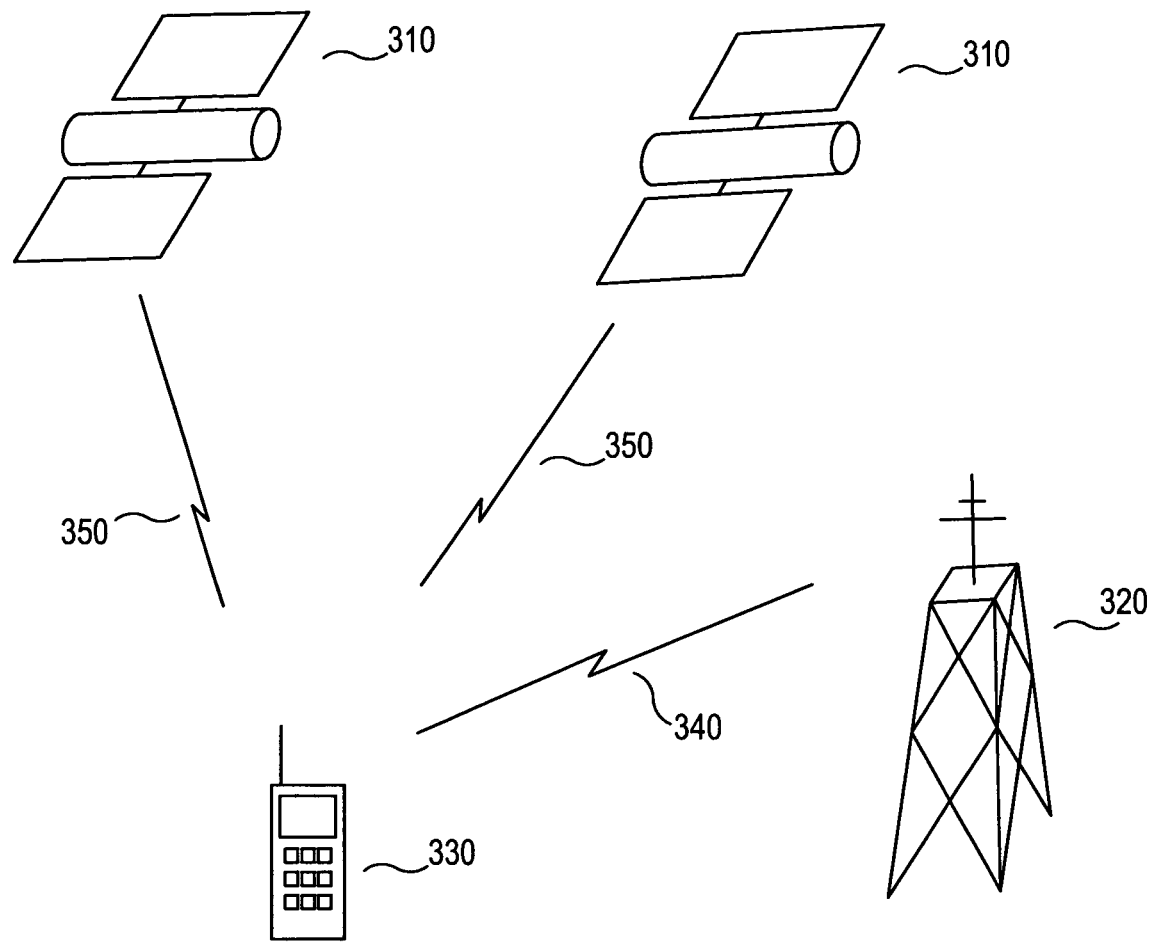
FIG. 3 illustrates a system, according to certain embodiments of the present invention.

FIG. 3 illustrates a system according to certain embodiments of the present invention. As shown in FIG. 3, the system may include a constellation of satellites 310. The satellites 310 may be GPS satellites, or other similar satellites, such as Glonass satellites. The system may also include a base station 320, such as an evolved Node B. Other kinds of base stations or relay stations are also permitted. The system may further include a terminal 330, such as a third or fourth generation mobile phone. The terminal 330 may be configured to receive signals 350 from the satellites 310 and to send signals 340 to the base station 320. In certain instances, sending the signals 340 may interfere with reception of the signals 350 from the satellites. Accordingly, the terminal 330 may employ data throttling, as described above, to limit the time periods during which transmission of signals 340 to the base station 320 occur. Thus, the terminal 330 may be able to receive signals 350 from the satellites 310 with greater accuracy and reliability.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    detecting a potential for interference between a transmitting subsystem of a terminal and a receiving subsystem of a terminal, wherein the detecting the potential for interference comprises determining a required use of the receiving subsystem; and
    buffering transmission by the transmitting subsystem of the terminal so as to lower a duty cycle of the transmitting subsystem, wherein the buffering transmission comprises holding packets for transmission in a secondary buffer located logically prior to a main buffer.

2. The method of claim 1, wherein the detecting the potential for interference comprises determining that the transmitting subsystem has a duty rate in excess of a predetermined threshold.

3. The method of claim 1, further comprising:
    reporting, by the terminal, only the status of the main buffer when providing a buffer status report to a base station.

4. The method of claim 1, wherein the transmitting subsystem is a long term evolution communication subsystem.

5. The method of claim 1, wherein the receiving subsystem is a global positioning system navigational subsystem.

6. A computer program embodied on a non-transitory computer-readable medium, which when executed in hardware performs a process, the process comprising:
    detecting a potential for interference between a transmitting subsystem of a terminal and a receiving subsystem of a terminal, wherein the detecting the potential for interference comprises determining a required use of the receiving subsystem; and
    buffering transmission by the transmitting subsystem of the terminal so as to lower a duty cycle of the transmitting subsystem, wherein the buffering transmission comprises holding packets for transmission in a secondary buffer located logically prior to a main buffer.

7. The computer program of claim 6, wherein the detecting the potential for interference comprises determining that the transmitting subsystem has a duty rate in excess of a predetermined threshold.

8. The computer program of claim 6, the process further comprising:
    reporting only the status of the main buffer when providing a buffer status report to a base station.

9. The computer program of claim 6, wherein the transmitting subsystem is a long term evolution communication subsystem.

10. The computer program of claim 6, wherein the receiving subsystem is a global positioning system navigational subsystem.

11. An apparatus, comprising:
    at least one memory including computer program code; and
    at least one processor,
    wherein the at least one memory and the computer program code are configured to, with the at least one processor, cause the apparatus at least to
    detect a potential for interference between a transmitting subsystem of a terminal and a receiving subsystem of a terminal, wherein the detecting the potential for interference comprises determining a required use of the receiving subsystem; and
    buffer transmission by the transmitting subsystem of the terminal so as to lower a duty cycle of the transmitting subsystem, wherein the buffering transmission comprises holding packets for transmission in a secondary buffer located logically prior to a main buffer.

12. The apparatus of claim 11, wherein the at least one memory and the computer program code are configured to, with the at least one processor, cause the apparatus at least to detect the potential for interference by determining that the transmitting subsystem has a duty rate in excess of a predetermined threshold.

13. The apparatus of claim 11, wherein the at least one memory and the computer program code are configured to, with the at least one processor, cause the apparatus at least to report only the status of the main buffer when providing a buffer status report to a base station.

14. The apparatus of claim 11, wherein the transmitting subsystem is a long term evolution communication subsystem.

15. The apparatus of claim 11, wherein the receiving subsystem is a global positioning system navigational subsystem.

* * * * *